United States Patent [19]

Cinpinski

[11] Patent Number: 4,711,215
[45] Date of Patent: Dec. 8, 1987

[54] LPP COMBUSTION CONTROL FOR IC ENGINE WITH ABNORMAL COMBUSTION

[75] Inventor: Kenneth J. Cinpinski, Sterling Heights, Mich.

[73] Assignee: General Motors Corporation, Detroit, Mich.

[21] Appl. No.: 923,577

[22] Filed: Oct. 27, 1986

[51] Int. Cl.$^4$ .............................................. F02P 5/15
[52] U.S. Cl. ................................... 123/425; 123/417
[58] Field of Search .............. 123/425, 417, 146.5; 364/431.08; 73/35

[56] References Cited

U.S. PATENT DOCUMENTS

| | | |
|---|---|---|
| 3,205,880 | 9/1965 | Hartel et al. ................ 123/146.5 |
| 3,875,912 | 4/1975 | Bullo ................................ 123/425 |
| 3,957,023 | 5/1976 | Peterson ....................... 123/117 R |
| 4,063,538 | 12/1977 | Powell et al. .................. 123/117 R |
| 4,131,097 | 12/1978 | Sawada et al. .................... 123/425 |
| 4,153,019 | 5/1979 | Laubenstein et al. .......... 123/117 R |
| 4,406,265 | 9/1983 | Brandt et al. ...................... 123/425 |
| 4,481,925 | 11/1984 | Karau et al. ....................... 123/425 |
| 4,491,010 | 1/1985 | Brandt et al. ......................... 73/35 |
| 4,601,197 | 7/1986 | Fattic et al. ....................... 73/117.3 |

Primary Examiner—Raymond A. Nelli
Attorney, Agent, or Firm—Robert M. Sigler

[57] ABSTRACT

An LLP ignition timing control for an internal combustion engine periodically senses LPP in an engine combustion chamber and generates an average LPP value. A DLPP value indicating a desired LPP is generated; and ignition timing is periodically adjusted. The apparatus advances ignition timing if the average LPP value is retarded with respect to the DLPP value. The ignition timing is maintained in the same direction as the previous adjustment if the average LPP is advanced and becoming less advanced with respect to the DLPP value, but is reversed to the opposite direction from that of the previous adjustment if the average LPP is advanced and becoming more advanced with respect to the DLPP value. The amount of adjustment is proportional to the product of the difference between the average LPP value and DLPP value and the rate of change in the average LPP value. Thus, MBT is maintained in spite of the foldover effect in the LPP vs. spark advance curve produced by abnormal combustion modes without the need for independently sensing the abnormal combustion modes themselves.

3 Claims, 8 Drawing Figures

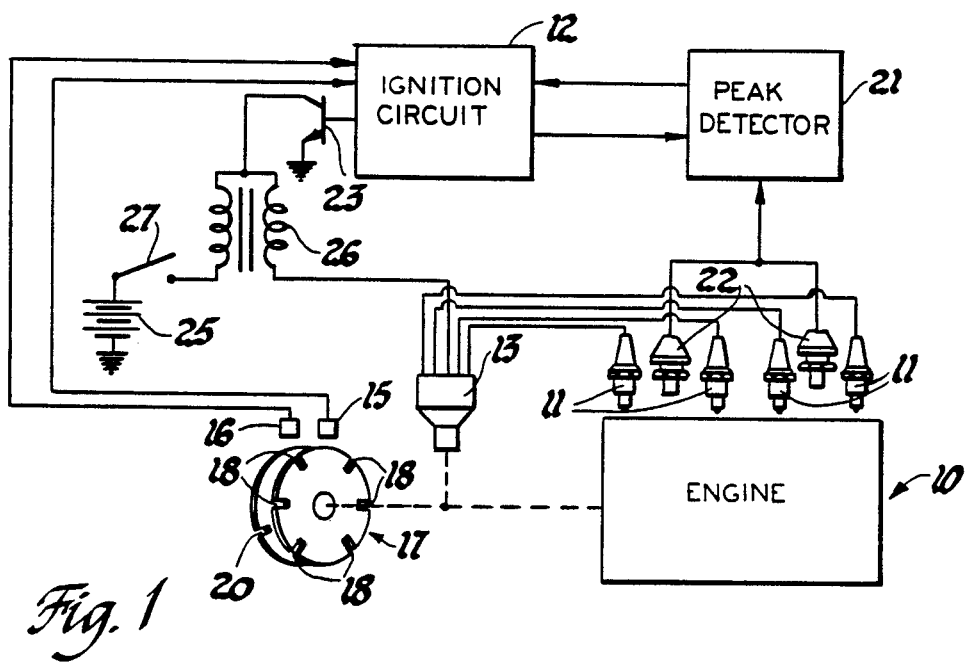
Fig. 1
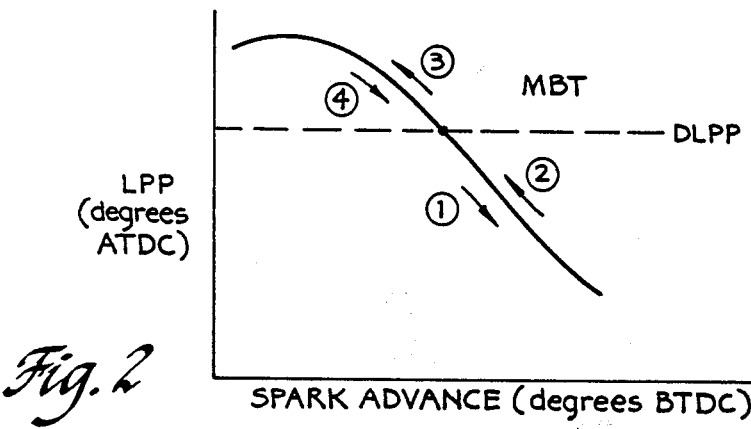
Fig. 2
| CASE | OLD [DIR] | ELPP | DELPP | NEW [DIR] |
|------|-----------|------|-------|-----------|
| 1 | + | + | − | − |
| 2 | − | + | + | − |
| 3 | × | − | × | + |
| 4 | × | − | × | + |
Fig. 3

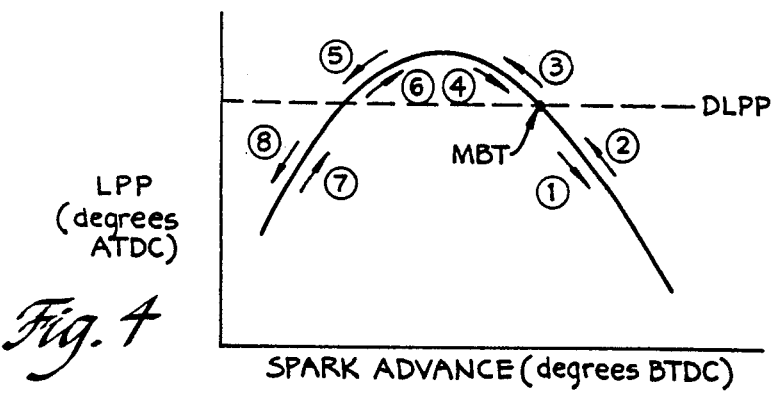
Fig. 4
| CASE | OLD [DIR] | ELPP | DELPP | NEW [DIR] |
|---|---|---|---|---|
| 1 | + | + | − | − |
| 2 | − | + | + | − |
| 3 | X | − | X | + |
| 4 | X | − | X | + |
| 5 | X | − | X | + |
| 6 | X | − | X | + |
| 7 | + | + | + | + |
| 8 | − | + | − | + |
Fig. 5
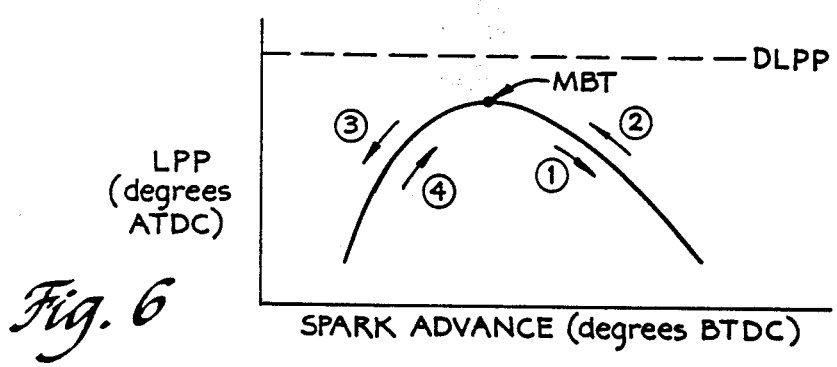
Fig. 6
| CASE | OLD [DIR] | ELPP | DELPP | NEW [DIR] |
|---|---|---|---|---|
| 1 | + | + | − | − |
| 2 | − | + | + | − |
| 3 | − | + | − | + |
| 4 | + | + | + | + |
Fig. 7

LPP COMBUSTION CONTROL FOR IC ENGINE WITH ABNORMAL COMBUSTION

BACKGROUND OF THE INVENTION

This invention relates to a closed loop LPP ignition timing control for an internal combustion engine suitable for a motor vehicle. In such a control, the location, in crankshaft angle relative to top dead center, of peak combustion pressure in the combustion chamber (LPP), or a computed average peak combustion pressure (ALPP), is compared with a desired location of peak pressure (DLPP); and an engine ignition parameter such as spark timing is adjusted to return LPP toward the desired value and thus maintain MBT ignition timing. DLPP is generally about 15 degrees ATDC, although this may vary slightly among different engines or in engine operation.

An LPP ignition timing control of this type is shown in the U.S. Pat. No. 4,481,925, to Karau et al, issued Nov. 13, 1984. In this system, the signal from a combustion pressure sensor is processed by a peak detector and an LPP signal generated to control engine spark timing in a closed loop feedback control. However, the accurate operation of a closed loop system as shown in Karau et al U.S. Pat. No. 4,481,925 depends upon the presence of certain events and relationships which are generally assumed but are, unfortunately, not always present for all engine operating conditions. For example, a detectable peak combustion pressure must exist and be accurately assignable to a particular crankshaft angular position. The LPP point must not be varying too greatly or quickly for stable closed loop control. Changes in ignition timing must produce predictable changes in LPP and must be capable of bringing LPP to the desired value, DLPP.

Although these conditions are true for most operating modes of a typical internal combustion engine, they can not always be relied upon. In particular, conditions of high dilution from exhaust gas recirculation or lean mixture, greatly retarded spark and light engine load result in slower burning combustion with a low, flat combustion pressure curve. Since most internal combustion engines have a plurality of combustion chambers, fuel tends to be unevenly distributed among them, even with the most careful design. As combustion becomes more marginal due to a high average dilution level, the percentage of misfires in the leanest combustion chambers becomes higher. This leads to wide variations in the locations of detected pressure peaks or an increase in the percentage of nonexistent or undetected peaks.

In addition, the relationship between LPP and ignition timing becomes adversely affected. In normal combustion the two are related over most of the usable range of ignition timing in a relatively well behaved, single functional manner, which may even be approximately linear. An example of a curve expressing such a relationship is shown in FIG. 2. Thus a simple closed loop control is adequate to maintain LPP at the desired level DLPP. However, in engine operating modes involving high fuel dilution and light engine loads, the curve of the relationship can appear as in FIG. 4, with a fold-over effect in the retarded spark region which produces an ambiguity in the relationship and a reversal of the slope of the curve in a portion of the region which makes closed loop control difficult. In some modes the curve can even fall completely below the desired LPP level DLPP, as shown in FIG. 6, in which case, control to DLPP is impossible.

These problems have been discussed, to the knowledge of the inventor, in only one place in the prior art: the U.S. Pat. No. 4,596,218 to Karau et al, issued June 24, 1986. In this patent these problems are recognized; and an LPP combustion control is described in which a sensed abnormal combustion condition causes the control to change ignition timing toward predetermined stored timings and substitute temporary DLPP values in the closed loop control algorithm for the duration of the sensed abnormal combustion condition. The temporary DLPP values are derived from measured LPP so as to drive the LPP as closely as possible toward the actual desired value, DLPP. At the end of the sensed abnormal combustion condition, the temporary DLPP values are continued until the temporary and actual DLPP values converge. Abnormal combustion may be sensed as excessive variation in LPP, excessively advanced average LPP or excessive numbers of undetected pressure peaks.

Unfortunately, although the apparatus of Karau et al U.S. Pat. No. 4,596,218 was a great improvement over the prior art in handling such abnormal combustion in an LPP ignition timing control, it was discovered that there was at least one light throttle engine operating mode which it did not always handle correctly. Although some minor modification of the apparatus may have taken care of the matter, such modification was found to be unnecessary upon the invention of the apparatus described and claimed herein.

SUMMARY OF THE INVENTION

The apparatus of this invention is an LPP ignition timing control for an internal combustion engine including a combustion chamber, means effective to ignite a combustible charge within the combustion chamber and power output apparatus including a rotating crankshaft driven in response to the expansion of the combustible charge following the ignition thereof and having a predefined TDC rotational reference position. The ignition timing control comprises, in combination, means for periodically sensing LPP in the combustion chamber and generating an average LPP value therefrom, means for generating a DLPP value indicating a desired LPP and means for periodically adjusting ignition timing. The apparatus advances ignition timing if the average LPP value is retarded with respect to the DLPP value. The ignition timing is maintained in the same direction as the previous adjustment if the average LPP is advanced and becoming less advanced with respect to the DLPP value, but is reversed to the opposite direction from that of the previous adjustment if the average LPP is advanced and becoming more advanced with respect to the DLPP value. The amount of adjustment is proportional to the product of the difference between the average LPP value and DLPP value and the rate of change in the average LPP value.

A major advantage of the apparatus of this invention is that it adjusts ignition timing purely on the basis of the sensed LPP and its changes and does not require the independent sensing of abnormal modes of combustion. Thus, there is no problem with failure to detect a particular abnormal combustion mode. In addition, no additional sensors are required for the abnormal combustion modes.

SUMMARY OF THE DRAWINGS

FIG. 1 is a schematic diagram of an internal combustion engine incorporating an ignition timing control according to this invention.

FIGS. 2, 4 and 6 are curves of LPP in degrees ATDC vs. spark advance in degrees BTDC for three modes of engine operation.

FIGS. 3, 5 and 7 are tables showing the derivation of the direction of ignition timing adjustment for different cases as shown in the curves of FIGS. 2, 4 and 6.

DESCRIPTION OF THE PREFERRED EMBODIMENT

Figure 8:
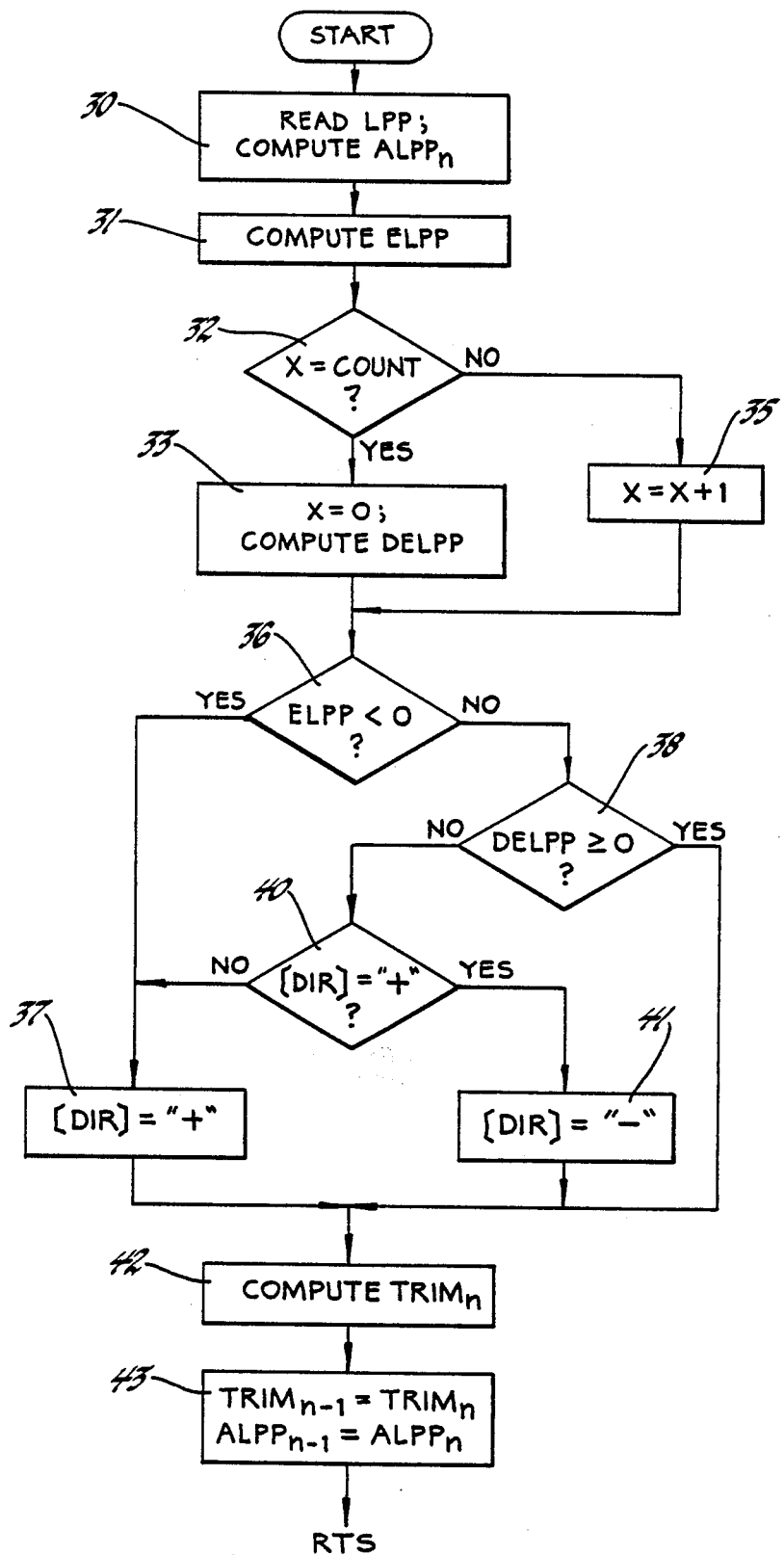
FIG. 8 shows a flow chart describing a portion of the method of operation of the apparatus seen in FIG. 1 which produces the results shown in the tables of FIGS. 3, 5 and 7 for the curves of FIGS. 2, 4 and 6.

Referring to FIG. 1, an internal combustion engine 10 includes a plurality of combustion chambers, not shown, in which combustion charges are ignited by means of spark plugs 11 to generate power through the expansion of gases against pistons and cause rotation of an engine crankshaft, not shown, in the normal manner of such engines. An ignition circuit 12 generates spark firing pulses which are routed to the proper spark plugs 11 through a distributor 13 or similar apparatus as is common in the prior art. Ignition circuit 12 may comprise a programmed digital computer which receives input timing pulses from a magnetic pickup 15 and sync pulses from a magnetic pickup 16. Pickups 15 and 16 are associated with a notched wheel 17 having a plurality of timing pulse generating notches 18 and a sync pulse generating notch 20 associated with respective pickups 15 and 16 to generate the pulses therein. For example, wheel 17 may be part of the crankshaft counterbalance; and pickups 15 and 16 may be of the variable reluctance type. Notch 20 and its associated pickup 16 may be axially displaced slightly from notches 18 and pickup 15 to keep the signals separate. The position signals from such an arrangement may be made very accurate by placing the apparatus on a torsional vibration node of the crankshaft. An alternative arrangement is to provide vanes or teeth of a magnetic material on a wheel at the front of the engine crankshaft with Hall effect sensors. From these pulses, ignition circuit 12 determines a reference crankshaft position for the firing of each spark plug 11 in proper succession. In the case of a four cylinder engine and a six notch wheel which rotates twice during a complete cycle of all four cylinders, every third pulse generated by notches 18 will correspond to a new cylinder and two successive such pulses mark a crankshaft angle of 60 degrees. Notch 20 provides a sync pulse to identify the individual timing pulses. The pulses from notches 18 and 20 are preferably used as the reference pulses for the entire ignition timing control for greatest accuracy; however, the normal distributor pulse generator may be used for the basic ignition timing reference pulses if necessary.

One or more combustion chamber pressure sensors 22 provide signals to a peak detector 21, which determines from said signals the location, relative to a TDC crankshaft reference, of peak combustion pressure (LPP) for each ignition event, if possible, and generates a number representing LPP for output. Combustion pressure sensors 22 may be of any known type but may particularly be of the type comprising a head bolt for engine 10 in conjunction with a quartz force ring compressed thereunder or of the type in which the head bolt itself includes a piezoelectric element affixed to the bolt head for flexure therewith. A preferred form of the latter type of sensor is shown in the U.S. Pat. No. 4,491,010 to Brandt et al, issued Jan. 1, 1985. In the case of a head bolt sensor, two sensors may suffice for the timing of a four cylinder engine, with one placed between cylinders 1 and 2 and the other placed between cylinders 3 and 4. The signals may be ORed together at the input to peak detector 21.

Peak detector 21 may itself be of the type shown in the above-mentioned Karau et al U.S. Pat. No. 4,481,925. This detector determines, for each ignition event, the LPP when it occurs within a crankshaft angle window of approximately 60 degrees ATDC, as it will for all normal combustion modes of engine 10. A number representing LPP is sent from peak detector 21 to an input of ignition circuit 12. Alternatively, peak detector 21 may differentiate the pressure signal with appropriate filtering as shown in the U.S. Pat. No. 4,406,265 to Brandt et al, issued Sept. 27, 1983.

Ignition circuit 12 includes a microprocessor based digital computer programmed to compute from the successive input LPP values an average LPP value (ALPP), determine ignition timing from this and other inputs as well as stored reference information and generate output ignition pulses at optimum times on the control electrode of an output power transistor 23 connected in series with a DC power source represented by vehicle battery 25, but understood to include all necessary components of a vehicle electrical power system. Transistor 23 is connected with battery 25 in the standard manner through the primary winding of a standard ignition coil 26 and the vehicle ignition switch 27. A secondary winding of ignition coil 26 is connected to provide high voltage pulses through distributor 13 to spark plugs 11 in the usual manner. Ignition circuit 12 may be based on that shown in the U.S. Pat. No. 4,231,091 to Motz, issued Oct. 28, 1980, modified where necessary as shown herein.

Ignition circuit 12 calculates, for each ignition event, the desired ignition timing relative to a reference engine crankshaft angle. Factors related to engine speed and load are stored in appropriate memory lookup tables and selected in response to the input of engine speed and load sensors as described in the Motz patent and other prior art references. This timing represents a stored ignition timing for the particular combination of engine speed and load, which is adjusted by a trim value (TRIM) derived from the LPP numbers received from peak detector 21.

The operation of that portion of ignition circuit 12 which computes the trim will be described with reference to the flow chart of FIG. 8. It is assumed that ignition circuit 12 has computed a standard or base ignition timing and stored it in a register or RAM memory location. It is also assumed that ignition circuit 12 maintains a stored and continually updated value of the average location of peak pressure, ALPP, which may be computed according to a standard digital lag filter equation from each new value of LPP received from peak detector 21. A typical first order lag filter equation will be of the form $ALPP_n = ALPP_{n-1} + G_1(LPP - ALPP_{n-1})$, wherein $ALPP_n$ is the new ALPP, $ALPP_{n-1}$ is the previously calculated ALPP, LPP is the latest input value of LPP and $G_1$ is a proportional gain factor. A first order filter is considered sufficient; however, those skilled in the art will be able to determine for themselves what filter equation to use according to their own requirements and to calibrate the gain constant G upon testing a particular engine. The flow chart of FIG. 4 may be considered a subroutine of the main program of ignition circuit 12.

The subroutine of FIG. 8 assumes a number of defined quantities, each of which is provided a memory address in RAM for use in the subroutine. These quantities include:

LPP: the most recently read value of the location of peak combustion pressure;

$ALPP_n$: the new average LPP;

$ALPP_{n-1}$: the last average LPP;

DLPP: the desired ALPP;

DELPP: the difference between $ALPP_n$ and $ALPP_{n-COUNT}$;

ELPP: the error in ALPP or $DLPP-ALPP_n$;

$TRIM_n$: the new trim value;

$TRIM_{n-1}$: the previous trim value; and

[DIR]: a signed direction bit or flag used in the TRIM equation.

There is also a gain constant $G_2$ used in the TRIM equation, which is stored in ROM.

The subroutine of FIG. 8 begins at step 30 by reading the most recently input value of LPP and computing $ALPP_n$ as previously described. Next, at step 31, the subroutine computes $ELPP=DLPP-ALPP_n$. DLPP itself is made to vary slightly with engine speed according to the equation $DLPP=15-(0.75 \text{ RPM})/(1000)$, wherein RPM is the engine speed in revolutions per minute. At decision point 32 the subroutine checks to see if the value of a counter X equals a stored reference COUNT, which determines the frequency of updating DELPP. If so, in step 33 the subroutine resets X to zero to begin a new count and then computes $DELPP=ALPP_n-ALPP_{n-COUNT}$. If COUNT has not yet been reached at decision point 32, however, X is incremented at step 35; and step 33 is skipped. Clearly, if COUNT=1, then $ALPP_{n-COUNT}=ALPP_{n-1}$.

The subroutine then determines the new value of [DIR] in a number of decision points and steps. Since [DIR] is a two valued function ("+" or "−"), it is convenient to represent it as a single bit (1 or 0) in a flag memory location. At decision point 36, it is determined if ELPP is less than zero, which corresponds to ALPP being retarded with respect to DLPP. If so, [DIR] is assigned a value corresponding to "+" in step 37, which will advance ignition timing. If ELPP is not greater than zero, the subroutine proceeds to decision point 38, at which it is determined if DELPP>=0, which corresponds to ALPP becoming more retarded. If so, [DIR] is unchanged from its previous value. If not, however, the subroutine reverses the value of [DIR] by asking, at decision point 40, if [DIR]="+" and changing it to [DIR]="−" in step 41 if the answer is yes or to [DIR]="+" in step 37 if the answer is no.

The value of [DIR] having been set, the subroutine next computes, in step 42, the new trim value, $TRIM_n=TRIM_{n-1}+[ELPP][DELPP][DIR]G_2$, wherein [ELPP] and [DELPP] are the absolute, unsigned values of those variables and [DIR] gives the sign to the quantity after the "+" sign and thus determines whether ignition timing is to become more or less advanced. The absolute value of ELPP is proportional to the error in ALPP; and the control is thus a proportional control. In addition, the absolute value of DELPP is proportional to the rate of change in ALPP, since it is proportional to the amount of such change in a reference time period (the period between successive trim determinations). In step 43, the old values $TRIM_{n-1}$ and $ALPP_{n-1}$ are replaced in memory by the new values $TRIM_n$ and $ALPP_n$, respectively, in preparation for the next TRIM determination.

The tables of FIGS. 3, 5 and 7 show the sign of $TRIM_n$ as determined by the apparatus of this invention for the LPP/Spark Advance curves shown in FIGS. 2, 4 and 6, respectively. When examining these curves, it should be remembered that LPP is measured in degrees after top dead center (ATDC) with larger values thus being more retarded, while spark advance is measured in degrees before top dead center (BTDC) with larger values thus being more advanced. In the table itself, "+" and "−" refer to the sign of the indicated variable; and "X" means "don't care". FIG. 2 shows the "best behaved" curve, for which the prior art is adequate but which will also be adequately handled by this apparatus. The curve is well behaved because it is essentially linear throughout its range, with no significant foldover. Each case represents a portion of the curve and a direction of movement along the curve as indicated in the Figure. For example, cases 1 and 3 represent movement along the curve away from the MBT point below and above, respectively, DLPP. Cases 2 and 4 represent movement toward MBT from below and above, respectively, DLPP. For each case, the corresponding signs of ELPP and DELPP lead to the indicated sign of [DIR], which, upon examination, proves to be the desired sign for closed loop control.

A slightly more difficult case is seen in the table of FIG. 5 and curve of FIG. 4. The most difficult cases are numbered 7 and 8. In a simple closed loop control of the prior art, the reversal of slope in this region below DLPP may tend to drive the spark to minimum advance and keep it there. In this apparatus, however, the overadvanced LPP causes the direction of correction in this region, as well as the other regions, to be toward MBT.

The table of FIG. 7 describes the response of the apparatus to the curve of FIG. 6, in which DLPP cannot be attained regardless of the spark advance by a simple closed loop control; and MBT is obtained at the maximum LPP attainable. In this environment, ALPP is never overadvanced; and the sign of [DIR] is set in response to the direction of change in ALPP and the previous sign of [DIR] so as to seek out the maximum point of the curve, which is labeled MBT in FIG. 6. Thus, MBT ignition timing is maintained by this apparatus in all modes of engine operation, regardless of changes in the relationship between LPP and spark timing.

The embodiments of the invention in which an exclusive property or privilege is claimed are defined as follows:

1. An LPP ignition timing control for an internal combustion engine including a combustion chamber, means effective to ignite a combustible charge within the combustion chamber and power output apparatus including a rotating crankshaft driven in response to the expansion of the combustible charge following the ignition thereof and having a predefined TDC rotational reference position, the ignition timing control comprising, in combination:

means for periodically sensing LPP in the combustion chamber and generating an average LPP value therefrom;

means for generating a DLPP value indicating a desired LPP;

means responsive to both of the aforementioned means for periodically adjusting ignition timing (1) in the advance direction if the average LPP value is retarded with respect to the DLPP value, (2) in the same direction as the previous adjustment if the average LPP is advanced and becoming less advanced with respect to the DLPP value, or (3) in the opposite direction from that of the previous adjustment if the average LPP is advanced and becoming more advanced with respect to the DLPP value, whereby MBT timing is maintained in spite of a foldover effect in the relationship between LPP and ignition timing.

2. The LPP ignition control of claim 1 in which the amount by which the ignition timing is periodically adjusted is proportional to the product of the difference between the average LPP value and DLPP value and the rate of change in the average LPP value.

3. The LPP ignition control of claim 1 further including means effective to determine, from the most recently determined average LPP value and the DLPP value, whether the average LPP value is retarded or advanced relative to the DLPP value and, from consecutively generated average LPP values, the direction of change in the average LPP value.

* * * * *